Figure 3:
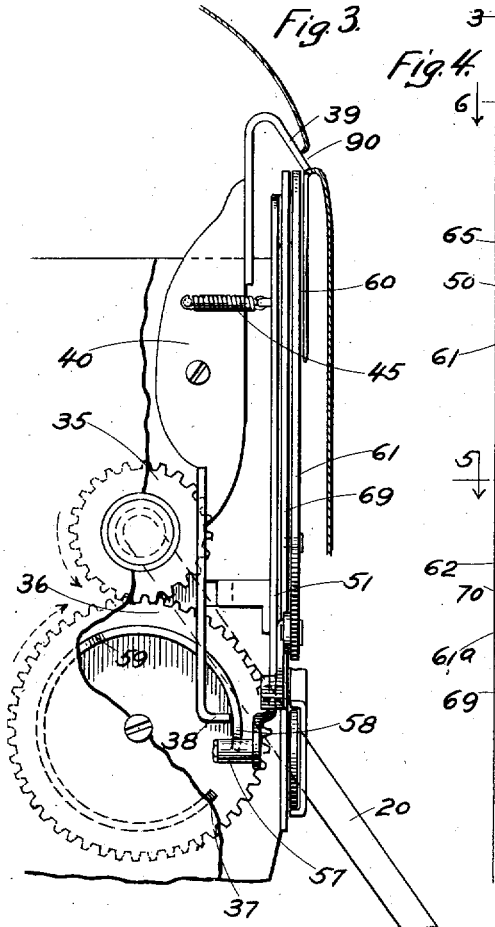

Reissued Apr. 1, 1913.
G. L. REICHHELM.
COIN CONTROLLED MECHANISM.
13,549.
APPLICATION FILED JAN. 23, 1913.
4 SHEETS—SHEET 1.
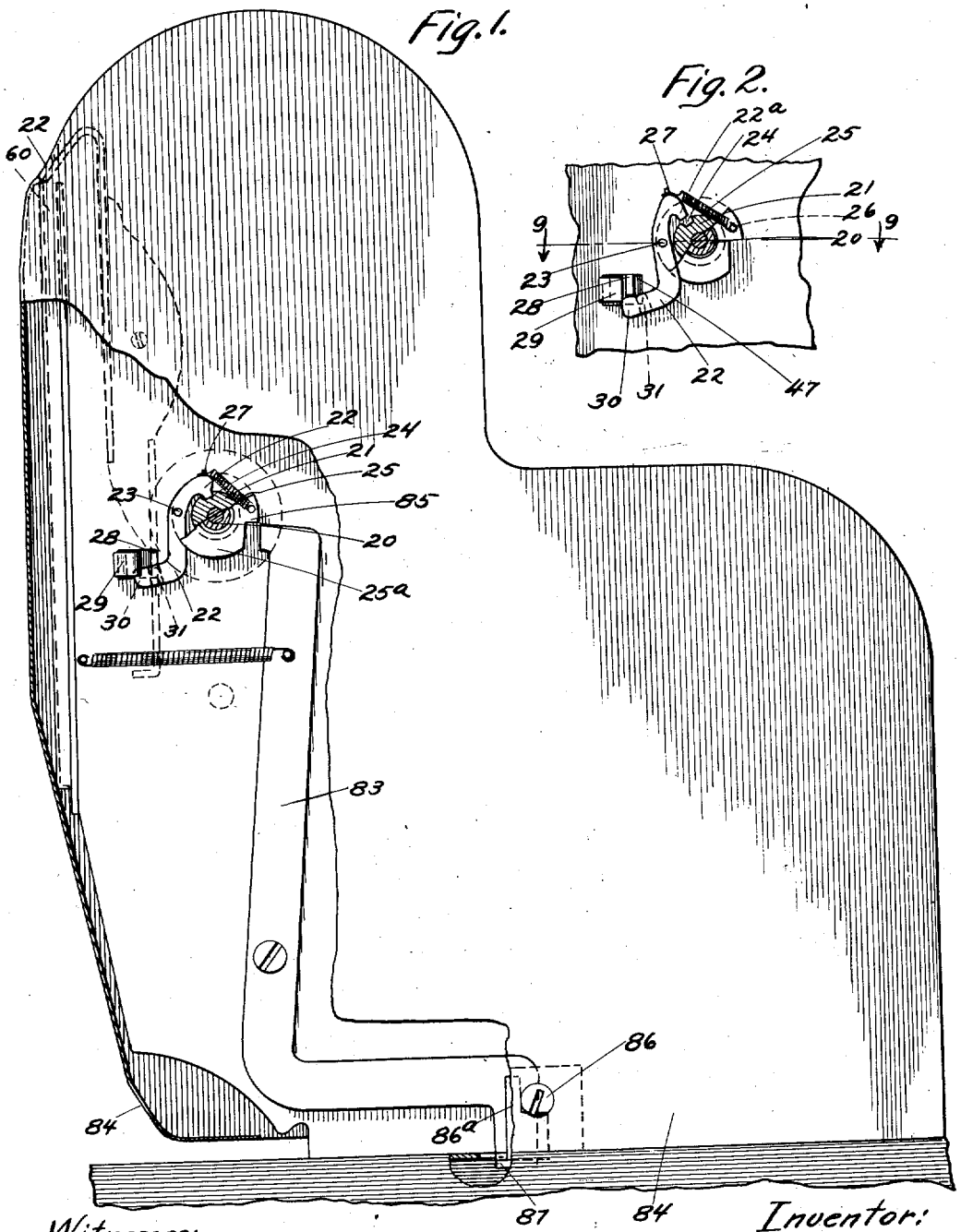
Witnesses:
C. E. Burnap
A. L. Walton
By
Inventor:
George L. Reichhelm
Sheridan, Wilkinson, Scott & Richmond
Att'ys.
COLUMBIA PLANOGRAPH CO., WASHINGTON, D. C Reissued Apr. 1, 1913.

G. L. REICHHELM.
COIN CONTROLLED MECHANISM.

13,549.

APPLICATION FILED JAN. 23, 1913.

4 SHEETS—SHEET 2.

Witnesses:
C. E. Burnap
A. L. Walton

Inventor:
George L. Reichhelm
By Sheridan, Wilkinson, Scott & Richmond
Att'ys

COLUMBIA PLANOGRAPH CO., WASHINGTON, D. C.

Reissued Apr. 1, 1913.
G. L. REICHHELM.
COIN CONTROLLED MECHANISM.
13,549.
APPLICATION FILED JAN. 23, 1913.
4 SHEETS—SHEET 3.
Fig. 7
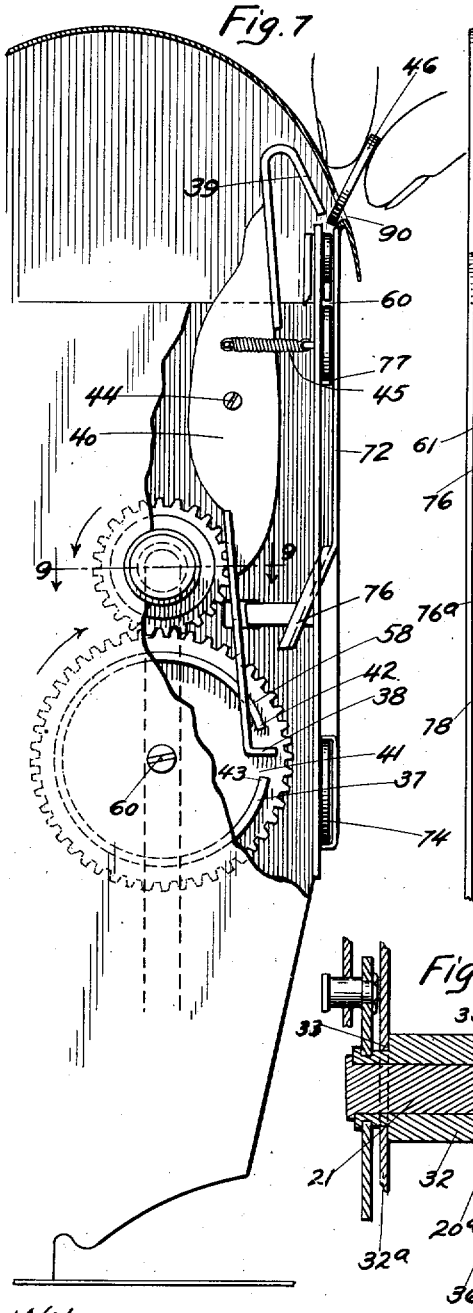
Fig. 8.
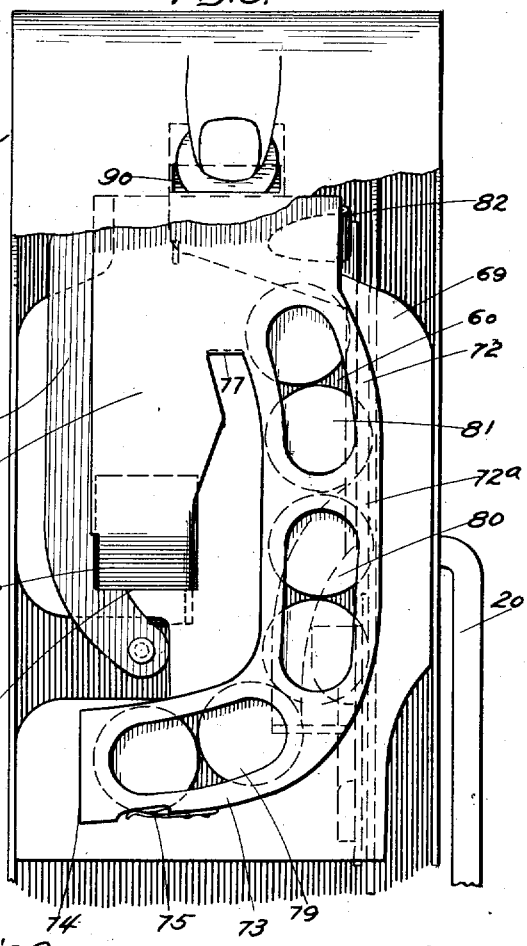
Fig. 9.
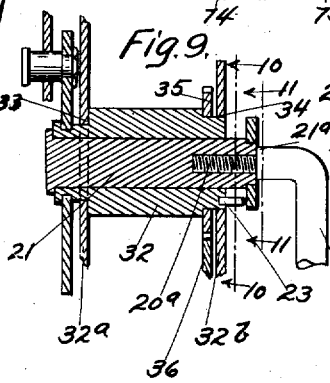
Fig. 10.
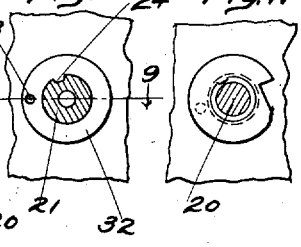
Fig. 11
Witnesses:
C. E. Burnap
A. L. Walton
Inventor:
George L. Reichhelm
By Sheridan, Wilkinson, Scott & Richmond Atty's
COLUMBIA PLANOGRAPH CO., WASHINGTON, D. C.

Reissued Apr. 1, 1913.
G. L. REICHHELM.
COIN CONTROLLED MECHANISM.
13,549.
APPLICATION FILED JAN. 23, 1913.
4 SHEETS—SHEET 4.
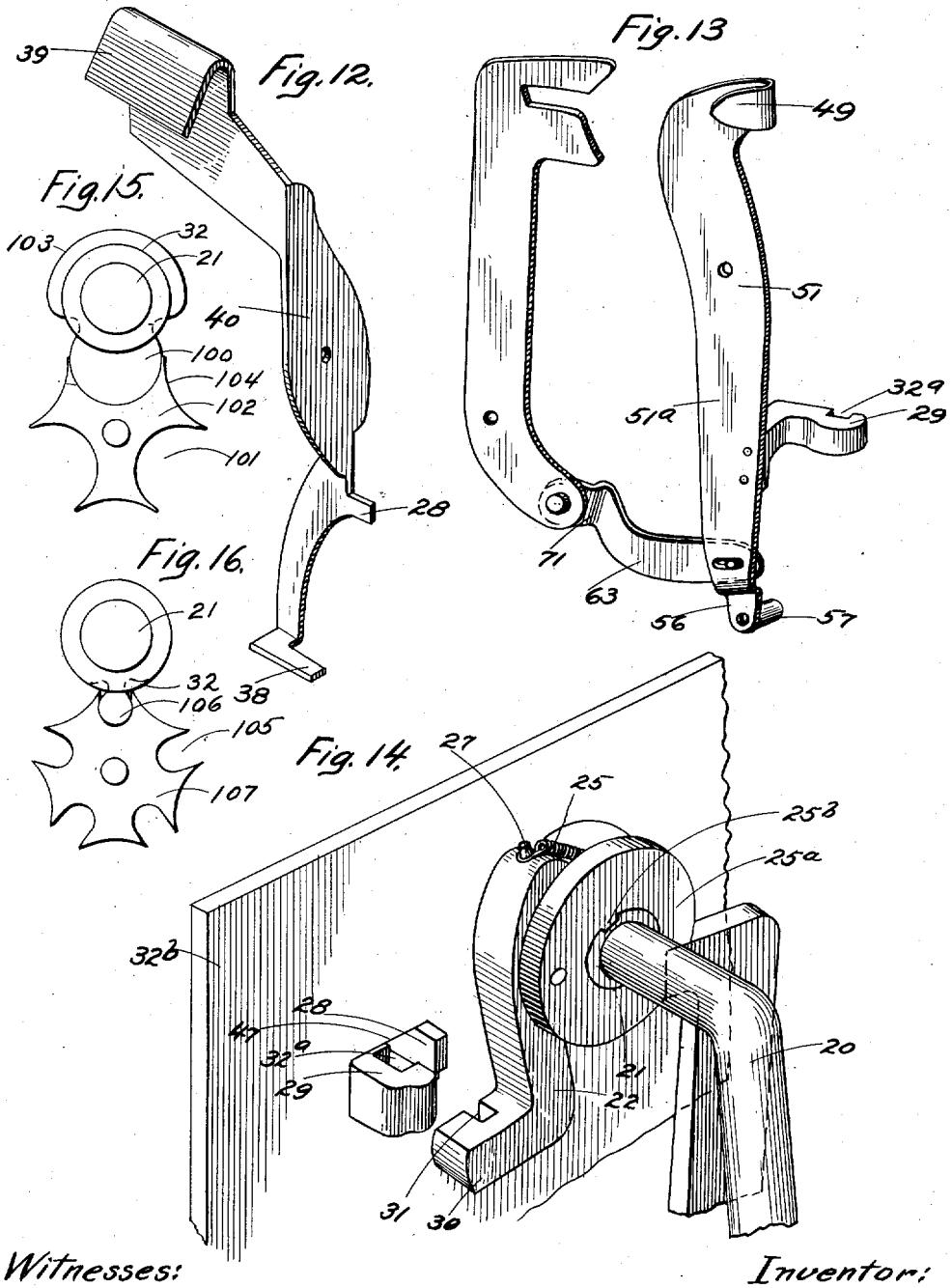
Witnesses:
C. E. Burnap
A. L. Walton
Inventor:
George L. Reichhelm
By Sheridan, Wilkinson, Scott & Richmond
Atty's
COLUMBIA PLANOGRAPH CO., WASHINGTON, D. C.

UNITED STATES PATENT OFFICE.

GEORGE L. REICHHELM, OF DETROIT, MICHIGAN, ASSIGNOR, BY MESNE ASSIGNMENTS, TO P. R. MANUFACTURING COMPANY, OF DETROIT, MICHIGAN, A CORPORATION OF MICHIGAN.

COIN-CONTROLLED MECHANISM.

13,549. Specification of Reissued Letters Patent. Reissued Apr. 1, 1913.

Original No. 1,045,185, dated November 26, 1912, Serial No. 611,883. Application for reissue filed January 23, 1913. Serial No. 743,881.

*To all whom it may concern:*

Be it known that I, GEORGE L. REICHHELM, a citizen of the United States, residing at Detroit, in the county of Wayne and State of Michigan, have invented certain new and useful Improvements in Coin-Controlled Mechanism, of which the following is a specification.

My invention relates to coin controlled mechanism and is especially designed for use in vending machines though it is applicable in other connections where it is desired to control the operation of mechanism by a coin or similar article.

An important object of my invention is to prevent fraudulent operation of the mechanism to which it is applied.

Another object is to provide a device whereby a plurality of operations of the machine and a predetermined number of said operations may be effected or permitted after the insertion of a single coin.

My invention has been particularly designed with reference to its application to stamp vending machines in which it is desired to deliver two or more stamps upon the insertion of a single coin.

A particular feature of my present invention is a chute for the coins having apertures permitting the coins to be seen, a resisting element in said chute to hold the coins therein, and means for forcing each of the coins into the said chute, said means being connected with and operated by the mechanism which is controlled by said coins.

My present invention comprises numerous improvements in the structure and principle of operation of my other inventions in the same classes which form the subject matter of pending applications for Letters Patent.

Other objects and advantages of my invention will become apparent in the following specification, taken in connection with the accompanying drawings, and the novel elements and combinations thereof will be more particularly pointed out in the claims.

Figure 4:
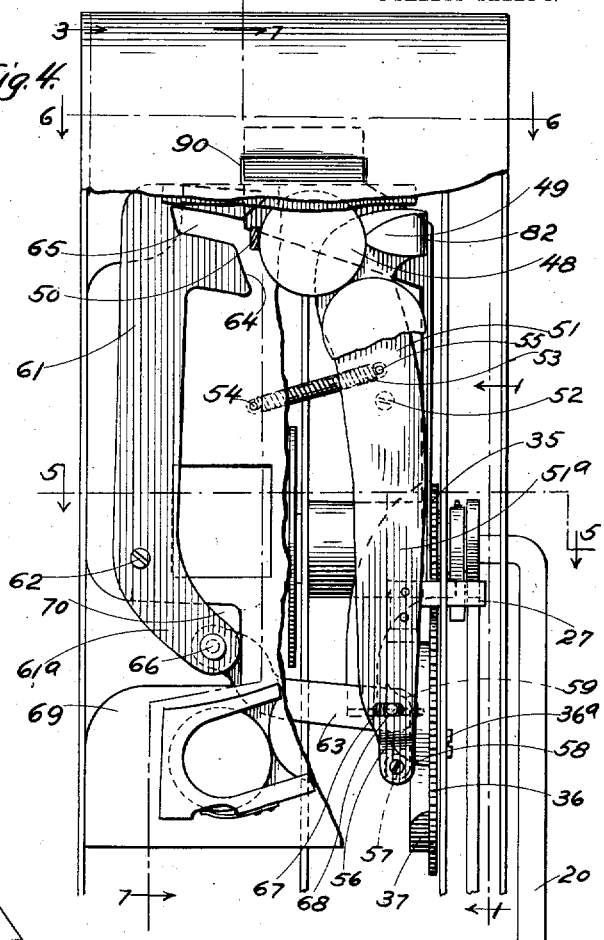
Figure 6:
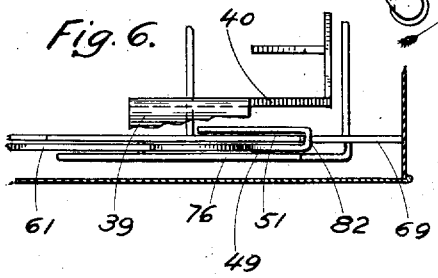
Figure 5:
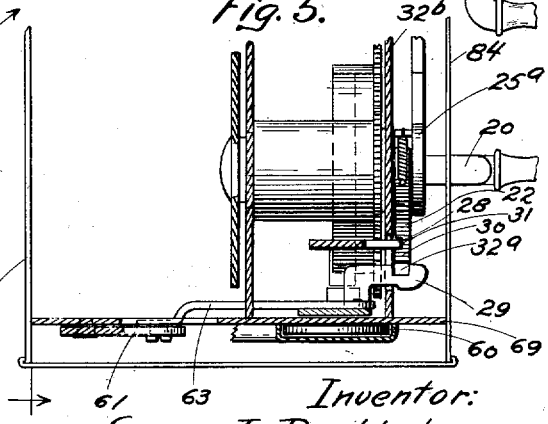

In the drawings—Figure 1 is a side elevation with a portion broken away, of a stamp vending and affixing machine to which my improvements are applied. Fig. 2 is a detail, showing the means for engaging the driving element with the driven element, in its unoperated position. Fig. 3 is a vertical section of a portion of said machine showing important parts of the mechanism. Fig. 4 is a front elevation of the machine with portions broken away in different planes to show the coin actuating levers and other parts of the mechanism. Fig. 5 is a horizontal section of a portion of the machine viewed from above and taken substantially on the line 5, 5 of Fig. 4. Fig. 6 is a horizontal section of a portion of the machine substantially on the line 6, 6 of Fig. 4. Fig. 7 is a vertical section with a portion broken away, substantially on the line 7, 7 of Fig. 4. Fig. 8 is a front elevation of the upper portion of the vending machine with a sufficient portion of the front face of the case broken away to show the coin chute and associated parts. Fig. 9 is a horizontal section through the axis of the driving shaft to which the hand crank is applied. This section is taken on the line 9, 9 of Figs. 7 and 2. Fig. 10 is a vertical section taken at right-angles to Fig. 9 on the line 10, 10 thereof. Fig. 11 is a section taken at right-angles to Fig. 9 on the line 11, 11 thereof. Fig. 12 is a perspective view of one of the coin actuated levers. Fig. 13 is a perspective view of another of the coin actuated levers, showing also the lever which forces the coins into the chute, and also the link connecting said levers. Fig. 14 is a perspective view of the engaging means by which the operating crank or driving shaft is drivably connected with the driven shaft. This view also shows portions of the mechanism which control said engaging means. Fig. 15 shows a modification of the gearing to deliver three stamps. Fig. 16 shows a modification of the gearing to deliver a greater number.

Referring to the drawings, the hand crank 20 will be seen to have its inner end, or axial portion, threaded axially as shown at $20^a$, Fig. 9, into the driving shaft 21, and shouldered against the end of said shaft at $21^a$. A right hand rotation of the hand crank 20 would be seen to cause it to impart a rotary motion to the shaft 21. The shaft 21 will be seen to be axially mounted within the hollow shaft 32, which is in turn rotatively mounted by means of suitable bearings in the framework $32^a$ and $32^b$ of the machine as shown at 33 and 34.

My invention consists largely of means for controlling the operative engagement of the driving shaft 21 with the hollow or driven shaft 32. When not operatively engaged the driving shaft 21 is free to rotate within the hollow shaft 32 and the hand crank 21 may then be given any number of movements without effecting the desired operation of the vending machine or other appliance to which my invention may be applied.

The means for operatively connecting the shaft 21 with the shaft 22 is shown in a general way in the perspective view in Fig. 14. A lever 22 is pivotally attached by means of a pin 23 to the hollow or driven shaft 32. (See Figs. 1, 2 and 9). This pin 23 is fixed to the shaft 32 and the lever 22 pivoted therein is provided with a hook-shaped end 22[a], which is adapted to enter a notch 24 in the end portion of the driving shaft 21. The end of the hook-shaped portion is given substantially radial faces with respect to the axis of the shaft 21 and the notch in said shaft is also provided with corresponding radial faces so that when the end of the lever is in the said notch the two shafts 21 and 32 are non-rotatively engaged. The coin actuated levers 40 and 51 which control this engagement have projecting parts or terminals 28 and 29 which project through an aperture 47 in the frame of the machine and control the engagement of the lever 22 with the said shaft 21. A spring 25 is attached to a disk 25[a] at one end and to the lever 22 at the other end, and its tension is so arranged as to constantly tend to press the end 22[a] thereof into the notch 24. The disk 25[a] is fixed to the driving shaft 21 by means of the tongue 25[b] which preferably enters a continuation of the notch 24. The opposite end of the spring 25 is attached to the lever 22 by means of the pin 27.

The lever 22 is provided with an angularly disposed end 30 having a notch 31 therein. The projecting end or trip 28 on the lever 40 is adapted to normally have a position such that the notch 31 will pass over it without interfering with the position of the lever 22 with relation to the shaft 21. This will be the case when the upper end 39 of the lever 40 is in close relation with the aperture in the case 90 through which the coin is inserted, and thereby guarding the said slot. In any other position of the lever 40 the projecting end 28 would have a position such as would not permit the notch 31 to pass over it and the lever 22 would therefore strike the said end 28 and the engaging portion 22[a] of said lever would be moved out of the notch 24. The driving shaft 21 would then be disconnected from the shaft 32 and the machine could not be operated. Another projecting portion or terminal 29 attached to a lever 51 projects through the same aperture 47 in the framework and is provided with a notch 32[a] upon its inner face, which is adapted to permit the end 30 of the lever 22 to pass through when in its normal position. When both the levers 40 and 51 are in their normal positions or in such positions as the coin of the proper size when properly inserted will permit them to occupy, the ends 28 and 29 of said levers will permit the lever 22 to engage the notch 24 in the shaft 21. The shaft 21 will then be drivably connected or engaged with the shaft 32 and the machine may be operated.

Fixed to the shaft 32 is a spur gear 35, which meshes with and drives a spur gear 36, the latter having twice the diameter and twice the number of teeth that the former has. This latter gear 36 is rotatively mounted at 36[a] on the frame of the machine. The gear 36 will make one revolution while the gear 35 is making two revolutions. The gear 36 carries a cam 37 fixed thereto or integral therewith. This cam projects laterally from the body of the gear and has a concentric position thereon with relation to the pivot 36[a].

The cam 37 is interrupted at 41 and is adapted to permit the end 38 of the lever 40 to enter the space at 41, between the ends 42 and 43. It will be seen that this end 38 may enter the space 41 once during every revolution of the gear 36 and once during every two revolutions of the gear 35. The end 38 is adapted to interfere with the rotation of the gear 36. The gears 35 and 36 cannot be rotated when the end 38 is in the said space, and such a position thereof occurs when the upper end 39 of the lever 40 has been pushed back by a coin 46, as shown in Fig. 7. The lever 40 is pivotally attached to the framework at 44. An attempt to rotate the gears in the direction of the arrows as shown in Fig. 7 will cause the end 42 of the cam 37 to strike the end 38 of the lever when the latter is in its operated position, as in Fig. 7. When, however, the lever is in the normal position it should occupy as in Fig. 3 after the coin 46 is fully inserted in the machine the end 42 of the cam will pass the end 38. Rotation of the gear can then continue until the space 41 again reaches the end 38. The spring 45, fixed to the lever 40 at one end and to the frame at the other, tends constantly to move the lever to its normal position.

The end 38 is adapted to terminate or fit with reasonable closeness within the interior of the cam 37, and is thereby held in that position during a complete revolution of the gear 36. It will, therefore, hold the lever 40 in such position that its upper end 39 will close the aperture 90. The upper end 39 is given a downward and forward inclination to enable it to properly close said aperture and in order to permit its reaching said aperture without interference with other parts of the machine. It will be seen that the aperture 90 is closed during one revolution of the gear 36 and during two revolutions of the gear 35. It is, therefore, necessary to give the hand crank 20 two complete revolutions after one revolution has been started before another coin can be inserted in the aperture 90. Therefore, in the particular mechanism to which my improvements are applied, as shown in the accompanying drawings, two complete operations of the mechanism are permitted by the insertion of a single coin.

After the coin has passed through the aperture 90, it enters the space between a fixed abutment or rigid element 50 and a movable element 49. The coin as shown at 48 in Fig. 4, occupies this position. The normal position of the movable element 49 is at a point nearer to the fixed element 50 than is shown in Fig. 4. It is, therefore, necessary for the coin to push it out of the way before it can occupy the position shown. The movable element 49 is preferably integral with the lever 51, which is pivoted at 52. The spring 53 is attached to the lever at 55 and to the framework at 54, and tends at all times to move the element 49 toward the rigid element 50.

The lower arm 51ª of the lever 51 carries a projecting lug or tongue 29, which passes through the aperture 47 in the frame plate 32ᵇ. This tongue 29 has a notch 32ª which is adapted to permit the end 30 of the lever 22 to pass through when the said lever 51 is in its proper operative position. This position occurs when the coin 48 is of the proper size, and is fully inserted through the aperture 90 and between the fixed element 50 and the movable element 49. Should the coin 48 be the larger or smaller than as above described, the notch 32ª will not have a position which permits the passage of the end 30 of the lever 22. The tongue 29 in that case will interfere with the said lever 22 and prevent the operative engagement of the driving shaft 21 with the driven shaft 22. As previously described, the hook shaped end 22ª will be prevented from entering the notch 24.

The lower arm 51ª of the lever 51 is provided with the portion 56 which carries the roller 57, which is adapted to make contact with the initial curved portion 58 of the cam 37. When the gear 36 rotates it will be seen that the said cam will push the roller 57 to the left, (as viewed in Fig. 4,) and that the lever will be given such an oscillation as to move the end 49 away from the coin 48. The pressure produced by the spring 53 tending to hold the coin in the said position will be overcome and the coin will be released. Owing, however, to the fact that a series of coins occupies the chute 60 directly in the path of the coin 48, the said coin will remain in this position until forcibly removed therefrom. I have provided means for forcibly moving the coin into the chute as described below. The portion of the cam, acting upon the roller 57, extends from the initial curved portion 58 to a terminal portion 59. This portion of the cam has a greater height than the remaining portion extending from 59 to 37. This higher portion of the cam holds the movable element 49 out of contact with the coin 48 during a period of time approximating one-third of the revolution of the gear 36.

Simultaneously with the above described releasing movement of the lever 51, the lever 61 is made to engage the coin and force it into the chute 60. The lever 61 is pivoted to the framework at 62. The link 63 connects the lower arm 51ª of the lever 51 with the lower portion 61ª of the lever 61. When the arm 51ª is pushed to the left by the cam 58 the link 63 transmits the movement to the pin 66 in the arm 61.

The upper end of the lever 61 is provided with a curved face 64 adapted to engage the circular edge of the coin 48. In order to permit this portion of the lever to move to the right without interference with the fixed element 50 a notch or slot 65 is cut in the lever. In order to bring about the release of the coin 48, before the lever 61 engages it and to permit the exact movement of the parts desired, the movement is transmitted from the arm 51ª to the link 63 by means of a pin 68 on said link 63 which works in a slot 67 in said arm.

In order to support the above described parts sufficiently, a plate 69 is fixed to the front edges of the plates 32ª and 32ᵇ. This plate 69 is provided with a notch 70 to permit the link 63 to be connected to the arm 61ª. The link 63 has a position behind said plate while the arm 61ª has a position in front of said plate. This necessitates an offset 71 in the link. The chute 60 is formed preferably of sheet metal, by means of suitable dies, and is given a position in front of the plate 69, the said plate forming one side of the chute. The chute comprises a curved portion 72 leading from a flat portion or body 76. This curved portion joins a vertical portion 72ª, which in turn joins a curved lower portion 73 which terminates in a substantially horizontal position. The terminal portion 74 is provided with a yielding element 75, which projects into the chute a sufficient distance to restrict the passage and thereby offer a resistance to the movement of the coins therein. The spring 75 serves as a retaining means for the coins in the chute, and a series of said coins remains constantly therein. They are caused to move along the chute by the incoming coin as at 48 which is forced into the chute by the lever 61, as previously described. Adjacent the initial part of the chute 72 is a diverting portion 77 which is adapted to cause a coin of improper size to roll down to the left. This diverting element 77 consists of a small lug or tongue bent inwardly from the body of the plate 76. A chute 76[a] receives these diverted coins and causes them to drop down into the lower portion of the machine and into a receptacle or box. An aperture 78 in the plate 69 permits the chute 76[a] to pass through and to carry the said coins back of said plate. The chute 60 is provided with a series of elongated apertures 79, 80 and 81, which allow the coins in the chute to be seen.

The above described arrangement of the plate 69 and the chute 60 permits a very convenient disposal of the movable element 49. The element 49 preferably lies between the plate 69 and the plate 76, of which latter the chute is made. This element 49 is curved backwardly around the edge of the plate 69, (see Fig. 6) as shown at 82, where it joins the body of the lever 51. The lever 51 has a position back of the plate 69 and is very conveniently pivoted thereto at 52. A lock lever 83 is provided for holding the shaft 21 while the handle 20 is being screwed into place or removed. This is done when the case 84 is in its proper position. The upper end of the lever 83 engages the notch 85 in the disk 25[a] when the case is unlocked. When the case is locked in position the bar 86[a] of the lock 86 presses downwardly upon the foot 87 of the lever 83 and moves the upper end of the said lever out of engagement with the disk 85, thereby freeing the shaft 21 and permitting the machine to be operated.

In the operation and use of my invention a coin of the proper size should first be inserted in the aperture 90, thereby pushing the end 39 of the lever 40 backwardly and causing the lower end 38 to enter the space 41 between the ends of the cam 37. This will prevent rotation of the gear 36 of the machine until the coin has been fully inserted after which the end 38 returns to its normal position. This arrangement prevents the use of such articles as a knife blade for fraudulently operating the machine. It will be seen that the machine cannot be operated until the coin has been fully inserted in the aperture and the end 39 allowed to return to its normal position closing said aperture. Should the coin inserted be of the proper size, the movable element 49 will be moved away from the fixed element 50 a sufficient distance to cause the lever 51 to move the tongue 29 into such position that the end of the lever 22 will pass through the notch 32[a]. A coin of any other size will cause the tongue 29 to interfere with the said lever and to prevent engagement with the notch 24 in the shaft 21. When such engagement takes place the operator can rotate the handle 20 and shaft 21 and cause them to rotate the shaft 32, thereby operating the machine. When thus operated the high portion 58 of the cam 37 will engage the roller 57 and push the lever 51 to the left. By means of the link 63 the lever 61 will be given an oscillation and the curved face 64 thereof will engage the coin 48 and force it in the chute 60. A resistance to the movement of the series of coins in the chute 60 is provided by the spring 75 adjacent the terminal of said chute. When a coin is forced into the initial portion of the chute, as described, the series of coins is moved along the chute and the coin at the end of the series will be forced out of the chute and will drop into a box or other suitable receptacle which may be provided for receiving them.

In the modification of the gearing shown in Fig. 15 three revolutions of the driving shaft 32 can be made and three stamps can be delivered after the insertion of a single coin. A single tooth 100 is attached to the driving shaft 32 and each revolution thereof causes the tooth to engage one of the notches 101 in the wheel 102. There are three notches 101 in the wheel 102. The circular portion 103 bears upon the concave surfaces 104 of the wheel 102 while the tooth 100 is moving from one notch to another.

In the modification shown in Fig. 16 there are five notches 105 which are engaged successively by the tooth 106 attached to the shaft 32. Five stamps can therefore be delivered during one revolution of the wheel 107. In like manner any number of stamps can be delivered upon the insertion of a single coin by using a wheel with the desired number of notches and a single toothed pinion to mesh therewith. These modifications otherwise perform the functions of the gears 35 and 36.

While I have described more or less precisely the details of construction, I do not wish to be understood as limiting myself thereto, as I contemplate changes in form and the proportion of parts and the substitution of equivalents as circumstances may suggest or render expedient without departing from the spirit of my invention.

I claim:

1. In a device of the character described, a driving element, a driven element, means by which said elements may be operatively engaged, coin actuated means for controlling said engaging means, a chute for coins, and means actuated by said driven element for forcing a coin into said chute.

2. In a device of the character described, coin-controlled mechanism, coin actuated means for controlling the operation of said mechanism, a chute for coins, and means actuated by said mechanism for forcing a coin into said chute.

3. In a device of the character described, coin-controlled mechanism, a chute for coins, means adapted to yieldably restrict the entrance to said chute and adapted when actuated by a coin of a certain size to permit the operation of said mechanism, and means actuated by said mechanism for forcing said coin into said chute.

4. In a device of the character described, coin-controlled mechanism, a chute for coins, a resisting element in said chute, means adapted to yieldably restrict the entrance to said chute and adapted when actuated by a coin of a certain size to permit the operation of said mechanism, and means actuated by said mechanism for forcing said coin into said chute.

5. In a device of the character described, coin-controlled mechanism, a chute for coins, a resisting element in said chute, means adapted to yieldably restrict the entrance to said chute and adapted when actuated by a coin of a certain size to permit the operation of said mechanism, said means being adapted to engage and hold said coin when pressed out of its restricting position by said coin, and means actuated by said mechanism for forcing said coin into said chute.

6. In a device of the character described, coin-controlled mechanism, a chute for coins, a resisting element in said chute, means adapted to yieldably restrict the entrance to said chute and adapted when actuated by a coin of a certain size to permit the operation of said mechanism, said means being adapted to engage and hold said coin when pressed out of its restricting position by said coin, means by which said mechanism may move said restricting element away from said coin thereby releasing it, and means actuated by said mechanism for forcing said coin into said chute.

7. In a device of the character described, coin-controlled mechanism, a case for said mechanism having an aperture to receive coins or the like, an immovable element within said casing adjacent the path of the coin passing through said aperture, a movable element opposed to said immovable element and adapted to restrict said path and to be actuated by said coin and adapted to control the operation of said mechanism, a chute adapted to receive said coin after it has passed said movable element, and means operatively connected with said mechanism for forcing said coin into said chute.

8. In a device of the character described, coin-controlled mechanism, a chute for coins, and means actuated by said mechanism for forcing a coin into said chute.

9. In a device of the character described, coin-controlled mechanism, a chute for coins, a resisting element associated with said chute, and means actuated by said mechanism for forcing a coin into said chute against the resistance of said element.

10. In a device of the character described, coin controlled mechanism, means actuated by a coin of a certain size for controlling said mechanism and adapted to engage and hold the coin when thus actuated, a chute for coins, and means actuated by said mechanism for forcing a coin from said holding means into said chute.

11. In a device of the character described, coin-controlled mechanism, means actuated by a coin of a certain size for controlling said mechanism and adapted to engage and hold the coin when thus actuated, means actuated by said mechanism for causing said holding means to release said coin, a chute for coins, and means for forcing said coin into said chute.

12. In a device of the character described, coin-controlled mechanism, means actuated by a coin of a certain size for controlling said mechanism and adapted to engage and hold the coin when thus actuated, a chute for coins, means actuated by said mechanism for forcing said coin into said chute, and means adjacent said chute for diverting a coin of improper size therefrom.

13. In a device of the character described, a driving element, a driven element, coin actuated means for controlling the operative engagement of said elements, means adapted to maintain the engagement between said elements throughout a predetermined extent of movement thereof, a chute for said coins, and means actuated by said engagement maintaining means for forcing the coin into said chute.

14. In a device of the character described, a driving element, a driven element, coin actuated means for controlling the operative engagement of said elements, a fixed member coacting with said coin to hold said coin actuated means in its operated position, means adapted to maintain engagement between said elements throughout a predetermined extent of movement of said elements, a chute for coins, and means actuated by said last named means for forcing the coin into said chute.

15. In a device of the character described, coin-controlled mechanism, a chute for coins, yieldable retaining means for holding said coins in said chute, a fixed element adjacent said chute, a movable element adapted to control the operation of said mechanism and actuated by a coin co-acting with said fixed element, and means actuated by said mechanism for forcing said coin into said chute.

16. In a device of the character described, coin-controlled mechanism, means actuated by a coin of a certain size for controlling said mechanism and adapted to engage and hold the coin when thus actuated, means actuated by said mechanism for causing said holding means to release said coin, a chute for coins, means for forcing said coin into said chute, and means for diverting said coin from said chute when said last named means is not actuated.

17. In a device of the character described, a chute for coins, means for forcing a coin into said chute, and means for diverting said coin from said chute when said forcing means is not actuated.

18. In a device of the character described, a driving element, a driven element, means for operatively engaging said driving and said driven elements, coin actuated means for controlling said engaging means, a second driven element actuated by said first named driven element and adapted to operate once while said first named driven element is given a plurality of operations, a cam on said second driven element, a chute for coins, and a lever actuated by said cam for forcing a coin into said chute.

In testimony whereof, I have subscribed my name.

GEORGE L. REICHHELM.

Witnesses:
GEO. L. WILKINSON,
HENRY A. PARKS.

Copies of this patent may be obtained for five cents each, by addressing the "Commissioner of Patents, Washington, D. C."